UNITED STATES PATENT OFFICE.

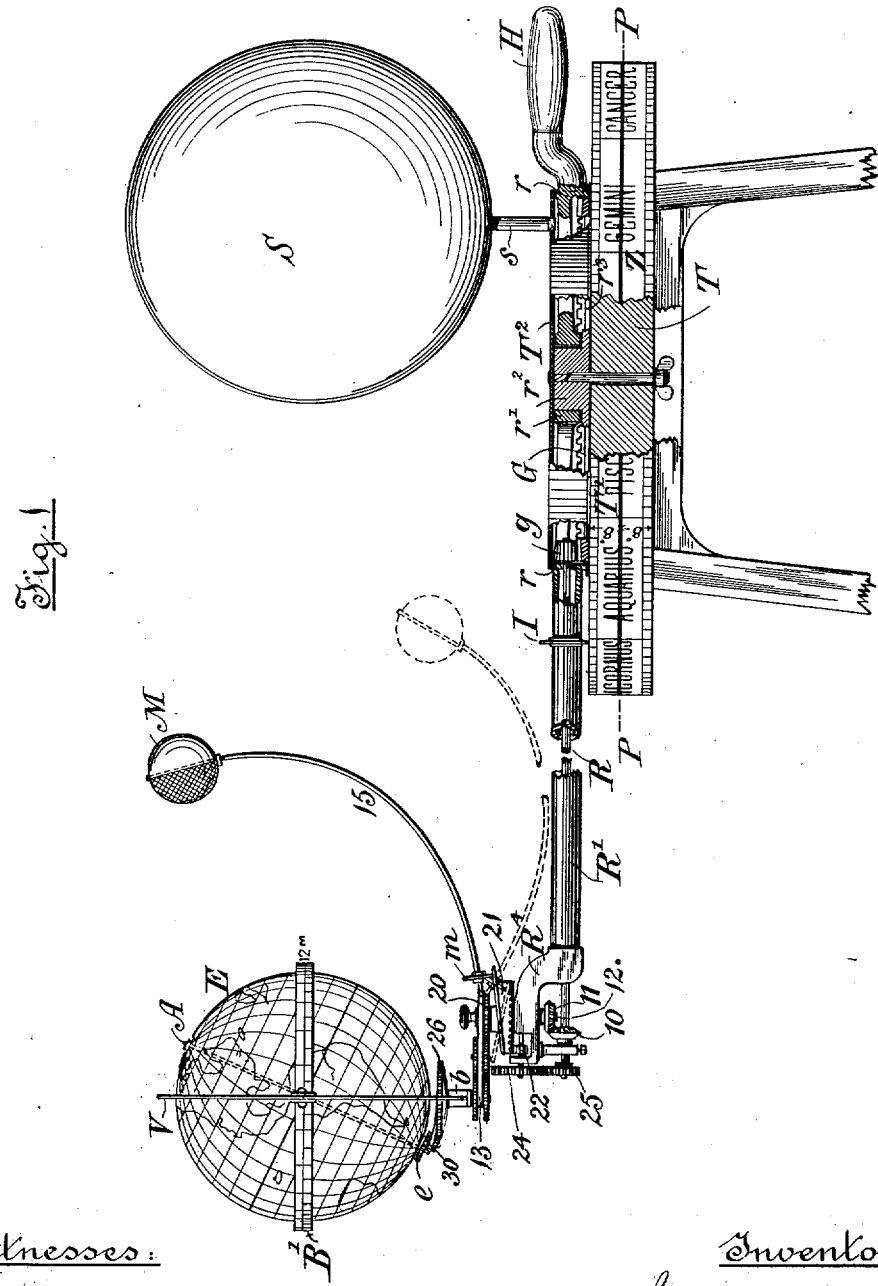

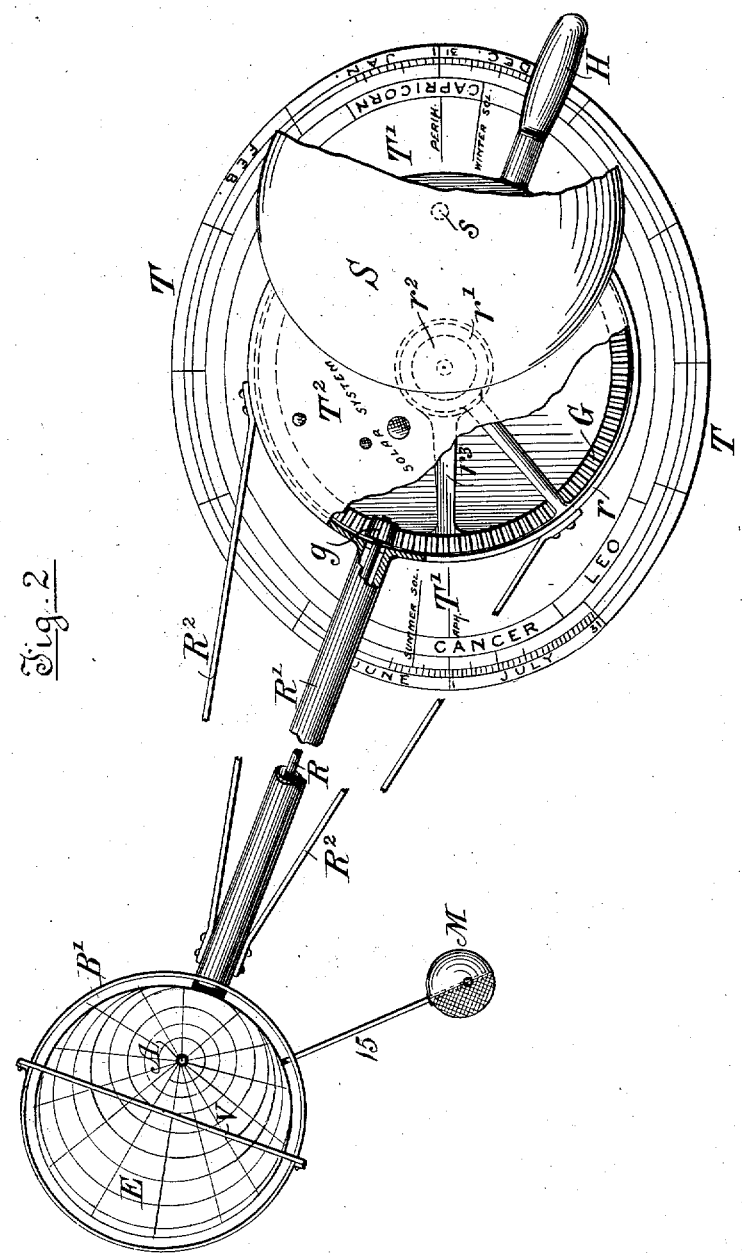

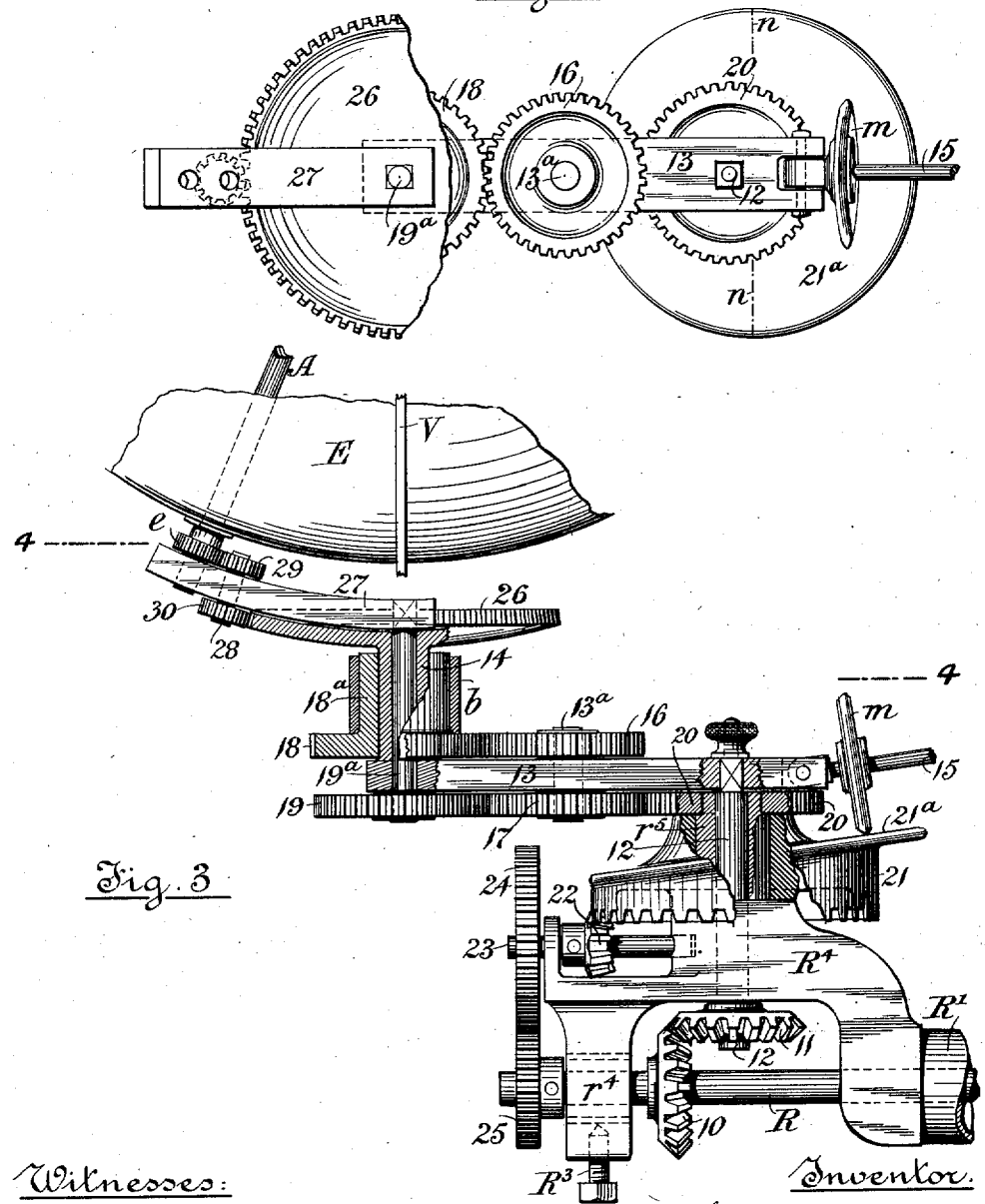

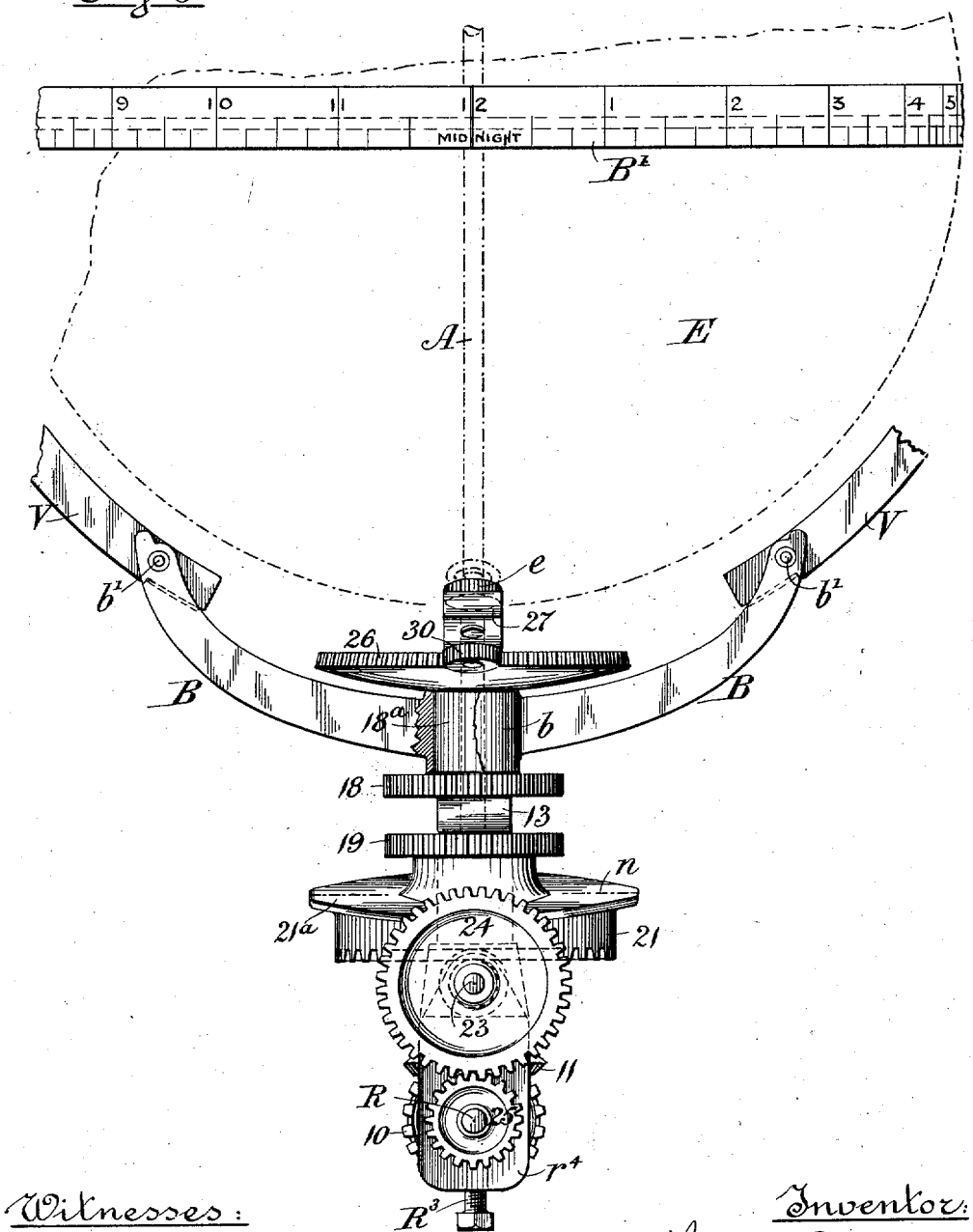

ISAAC N. MATLICK, OF PORTLAND, OREGON.

TELLURIAN.

1,019,981.  Specification of Letters Patent.  Patented Mar. 12, 1912.

Application filed June 10, 1910. Serial No. 566,211.

*To all whom it may concern:*

Be it known that I, ISAAC NEWTON MATLICK, a citizen of the United States, residing at the city of Portland, in the county of Multnomah and State of Oregon, have invented certain new and useful Improvements in Tellurians, of which the following is a specification.

This invention relates to educational appliances of that class commonly known as "tellurians" and designed for instruction and demonstration in the relative movements of the earth, moon and sun, and in the various physical results and phenomena which are due to the constant changes of the earth and moon in their respective orbits, around the sun, and in relation to each other.

The main objects of the present improvements are to effect more thorough and complete demonstrations of the above results and phenomena, and in a simpler and more effective manner than has been heretofore possible in instruments of this kind;—and also to illustrate the same for each and every day in the year, as well as monthly and annually.

Further objects of my new apparatus are to show and define at a glance the entire light and dark areas of the earth, and the varying lengths of day, night and twilight in the different latitudes, at any given or desired time,—and also to define geographically those opposite points upon the globe where the hours of twelve noon and twelve midnight exist contemporaneously, and so on throughout the whole twenty-four hours of light and dark, (upon the assumption that the point indicated as twelve noon will always lie in the plane defined between the centers of the earth and sun,) and thus mark the illumination and zones of the earth for any day in the year;—and also to show the points where the vertical rays of the sun fall upon the earth at different times of the year, and thus indicate the tropics.

A further particular object of the invention is to positively show the rise and fall of the moon in its orbit around the earth, alternately above and below the plane of the ecliptic, and to provide for the revolution of the moon in such manner that its nodes will be demonstrated as falling back the necessary number of days and fractions as they actually occur; and to show not only the causes of eclipses of the sun and moon, but also the dates of such occurrences for a number of years.

Another important object is to demonstrate mechanically that the earth is at its perihelion or nearest point to the sun on January 1st, and that it is in its aphelion six months later, or on July 1st, whereby it can be ascertained that the earth revolves faster in its orbit around the sun when it is at, approaching to and receding from the perihelion, than when it is at or near the aphelion.

The invention is also capable of mechanically-demonstrating the causes and phenomena of the equinoxes, precession of equinoxes,—the differences between solar and sidereal time,—method of computation of mean time,—the particular signs of the zodiac under which the sun, moon and earth will appear for any day in the year,—the correct daily ascension and declination of the sun, and also the number of minutes in any day in which the sun may be considered fast or slow. The purposes and results of all of these conditions will be apparent to educators in the science of astronomy.

To the above and other useful educational ends, the improvements consist in various instrumentalities, devices and combinations, of peculiar construction and arrangement,— all of which are particularly described and ascertained in the following detailed description of a preferred form of apparatus, the novel features thereof being definitely pointed out in the appended claims. For full comprehension, however, of my invention in its various parts and operations, reference must be had to the accompanying drawings forming part of this specification, in the several figures of which similar letters and numerals of reference indicate like parts.

In said drawings:—Figure 1 is a general side elevation, and Fig. 2 a general plan, both including the main instrumentalities employed in carrying out my invention, with parts broken away, and in section. Fig. 3 is a vertical-sectional side elevation (enlarged) of the mechanism whereby the various movements and conjunctions of the earth and moon and their relations to the sun are demonstrated. Fig. 4 is a plan view of portions of this mechanism taken on line 4, 4, Fig. 3. Fig. 5 is a front end elevation of Fig. 3, and specially illustrating the vertical band support and its connections.

The main instrumentalities employed in my apparatus are a table or stand T, of suitable construction, size and rigidity to conveniently support an elliptical top or platform T', graduated and marked as will be hereinafter more particularly described, and also, by preference, another and smaller platform $T^2$, which may be round or of any other configuration suitable for the marking thereupon of a pictorial illustration of the solar system. At the focus of the elliptical table nearest the perihelion of the earth, which is the point marked January first, is fixed a post $s$ upon which a globe S representing the sun is supported. It is from this table—serving as a base—that the demonstrator controls the movements of the various parts of the apparatus. Centrally upon the elliptical face of the table top is conveniently mounted an annular gear G with which meshes a pinion $g$ mounted upon the end of the main operating shaft R which extends forward in suitable supports, such as the tube R', with side braces $R^2$ here shown, from the table outward to the point where the earth E, and moon M, and the mechanism relating thereto are to be supported. Surrounding the annular gear G and platform $T^2$, and free to be rotated upon the table top, is a rim $r$ with suitable spokes and a hub $r'$, which latter embraces a central stationary post $r^2$ having a webbed frame $r^3$ preferably cast in one with the annular gear, and carried by the table. Preferably in the same horizontal line as the operating shaft R, but on the opposite side of and fixed to the rim $r$, is an operating handle H which—in the hand of the demonstrator—will be understood to cause the other parts of the apparatus consisting of the earth, moon, etc., to be moved collectively and individually in their respective relations, and also to move the whole around the sun S, which is a fixture upon the table T', as before mentioned.

The main operating shaft R while normally in position simply to be rotated within its tube support R' is free to be moved vertically to some extent within the tube by the manipulation of a set-screw $R^3$ having its bearing in a hanger $r^4$ projecting downward from a frame $R^4$ to be presently further mentioned. This shaft R has fixed upon that portion near its end which projects beyond the tube R', a bevel gear 10 which intermeshes with a similar bevel gear 11 fixed upon the lower end of a spindle 12, vertically mounted in the frame $R^4$ which forms an extension of the tube R'. The frame $R^4$ has formed in it a central vertical post $r^5$ affording a journal for this spindle 12, (as well as supporting other devices to be presently described,) which is squared at its upper end so as to have removably-fixed thereupon a horizontally-disposed bar 13 having longer and shorter arms on alternate sides of the spindle, this connection being near the end of the shorter arm. At the other extremity and in the longer arm of the bar 13 is fixed a vertical post 14 which carries the instrumentalities having more immediate relation with the globe E representing the earth, and to be hereinafter more particularly alluded to. To the outer end of the shorter end of the bar 13 is hinged one end of a curved rod 15 carrying a guide wheel $m$ close to the hinge, and upon the extreme outer end a ball representing the moon M, which when the apparatus is being actuated, continuously revolves in a vertically- and horizontally-variable orbit around the earth E, as will be further explained.

The longer arm of the bar 13 is perforated to loosely receive a short shaft $13^a$ carrying gears 16 and 17—one above and one below the bar, adapted to be revolved together and to mesh with other gears 18 and 19 respectively, in the same plane. The gear 17 also meshes with a gear 20 fixed upon the top of the post $r^5$ of the frame $R^4$. The gear 19 is fixed upon the lower end of a spindle $19^a$ journaled vertically in the post 14 of the bar 13,—and the gear 18 has an upwardly-projecting sleeve $18^a$ loosely embracing the post 14 and carrying in turn the hub $b$ of the vertical band-support B.

Loosely mounted upon the post $r^5$, of the frame $R^4$, and beneath the gear 20, is a peculiarly-shaped crown-gear 21, which is caused to revolve by means presently to be described. The upper side of the crown-gear is flat and disk-shaped, and set eccentrically to the post $r^5$, and also inclined from edge to edge. This inclined disk is marked $21^a$, and upon it impinges the guide-wheel $m$ carried by the rod 15 which supports the moon M, as before described. Node-lines $n$ are indicated on the face of the disk. The shaft 12 occupies one of the foci of the moon's orbit, and the disk $21^a$ is made to represent the ellipse traversed by that body. A further purpose is subserved by the eccentricity of said disk. It will be seen from Fig. 3 that at the highest point of the disk the center of the guide-wheel $m$ stands above the pivotal connection of the rod 15, which causes the wheel to tilt, thereby throwing the lower portion outward beyond the track it would occupy if it stood vertical, or tilted in the opposite direction as it would do at the lower portion. It is therefore necessary to have the disk elongated at the highest point to afford a base for the wheel $m$.

The fixed annular gear G has 161 cogs meshing with the pinion $g$ having 13 cogs, which rotates by moving the arm R' around its center, so that the rod R carrying pinion $g$ rotates with it; and by its connection with the bevel gears 10 and 11 the earth and moon are caused to rotate around their common center of gravity, causing each lunation to occur at the proper intervals of 29 1–2 days. At the outer end of the rod R is fixed the cog wheel 25, with 32 cogs, meshing with and rotating the wheel 24, which has 66 cogs, and is mounted on the shaft 23, carrying the pinion 22, having 13 cogs. The pinion intermeshes with the crown-gear 21 having 74 cogs. The inclination of the disk 21$^a$ gives the proper inclination of the moon's orbit to the plane of the ecliptic, as the guide-wheel $m$ carried by the rod 15 which supports the moon M, moves about its upper surface.

As the pinion $g$ will rotate 12 5–13 times in one year, the wheel 25 will make the same number of revolutions; and as the wheel 24 has 66 cogs, or two more than double the number of wheel 25, when the cog wheel 25 has made 12 revolutions wheel 24 will lack 12 cogs of having made six revolutions. But since wheel 25 must make 12 5–13 revolutions in one year, the additional 5–13 of a revolution will carry wheel 24 forward 12 additional cogs, thus making it complete six revolutions in one year. As the pinion 22 with 13 cogs rotates with the wheel 24, through the shaft 23 it follows that it must make six revolutions in one year, and thus carry the crown-gear 21 around in the proper direction 78 cogs, causing the moon's inclined orbit to maintain its proper relation and position, with reference to the sun and earth, as the earth and moon move around the sun. Since the crown-gear 21 has 74 teeth it follows that it must move 4 teeth more than one revolution around its axis $r^5$. As the crown-gear moves over 78 teeth in one year, or one tooth in 4 2–3 days, it will move over 74 teeth, or one complete revolution in 345 1–3 days, thus causing the sun to appear in the moon's node 19 2–3 days earlier each year. This appearance of the sun in the moon's node at an earlier point each year will make one complete revolution thereof, in 18 years and 10 days, in regard to the sun.

By loosening the thumb screw R$^3$ the cog wheels 25 and 24 and the bevel gears 10 and 11 will drop out of mesh and the position of the moon in its orbit and the inclined disk 21$^a$ may be readily adjusted for any year; and owing to the accuracy of the movement of the moon in its orbit and the revolution of the moon's nodes, not only the cause but the dates of eclipses are readily shown for a number of years. The index I on the arm R' is adapted to indicate the corresponding dates upon the chart.

Fixed upon the vertical post 14 and thus also in rigid connection with the longer arm of the bar 13, is a toothed disk made concave to conform to the surface of the globe E, on its upper surface, and designated number 26. This concavity is made to accommodate a similarly curved bar 27 the inner end of which is fixed upon the top of the spindle 19$^a$ projecting beyond its bearing in the post 14. The outer end of this curved bar 27 passes beyond the periphery of the toothed disk 26 and there loosely receives spindle 28 carrying two small gears (one just above and one below said bar) marked 29 and 30 respectively, the latter meshing with the toothed disk 26 and the former with the gear $e$ fixed upon the globe E, at what may be called the south pole. At a distance of 23 1–2 degrees from the central point of the shaft 19$^a$ along the arc of the curved bar 27, and rigidly supported thereon at the proper angle of the inclination of the earth, is a fixed rod A representing the axis of the earth, and preferably extending through the globe, as shown.

The revolution of the earth globe is accomplished in the following novel manner. The concave wheel 26 has 109 cogs. As the earth and moon move around their center of gravity during each lunation, the wheel 26 makes a gyration around the center shaft 12, and the shaft 19$^a$ carrying the earth globe is kept in a relatively fixed position. The pinion 30 with 16 cogs is fixed to the short shaft 28 and will rotate the pinion 29 which meshes with the pinion $e$, which is secured to a hollow tube passing through and fixed to the globe E. The pinions 29 and $e$ preferably have the same number of cogs, which in this case is 20. The inclined axis A, of the earth passes through that body and around it the earth revolves. By the revolution of the earth and moon on the central shaft 12 and the relatively fixed position of the curved bar 27, the earth is caused to rotate in its proper direction, but with the above combination, only once in four days, as it is found best for illustrative purposes not to rotate it faster. If for scientific or other purposes, it is desired to rotate the earth globe faster, or once for each day it may be readily accomplished by increasing the number of cogs in the wheel 29 to four times the number in $e$.

As the wheel 26 has 109 cogs and the pinion 30 has 16, when the former makes one complete revolution the pinion 30 will have rotated 6 13–16 times; but as there are 12 5–13 lunations in one year, and as the curved bar 27 to which the pinion 30 is fixed, moves completely around the concave wheel 26, once in a year, it makes wheel 26 move around in connection with the pinion 30, 13 5–13 times in one year.

As before mentioned, the sleeve 18$^a$ of the gear 18, has rigidly fixed thereto but rotatable therewith, the hub $b$ having two outwardly and upwardly curved arms forming the band support B, each end being adapted to receive an end of the circular band V part of which is eliminated at the bottom, extending vertically therefrom and embracing at its median point, the globe E, representing the earth, in such manner as not to interfere with the regular movements thereof. Short bolts $b'$ connect the ends of the vertical band V with its support. At right angles to this vertical band, and always in the plane of the ecliptic, is a horizontal band B' made in two pieces, each encircling one-half of the globe, and one or both pieces being pivoted to the sides of the vertical band V midway between its top and bottom, so as to be wholly or partially foldable thereupon, and thus allow of the band being easily removed from its operative position around the globe when desired. The gear wheel 20 has 40 teeth meshing with wheel 17 having the same number of teeth and revolving on shaft $13^a$ carrying the idler 16 which also has 40 teeth meshing with wheel 18 having 40 teeth and which is rigidly fixed to the hub $b$, upon which is mounted the support B. Owing to this relative number of teeth these elements will maintain a fixed relation to each other. It will therefore, be seen that as the earth and moon move about their common center, there will be no variation of the band V with relation to the sun, which will thus keep the point marked "12 noon" on the horizontal band B' always on the line between the center of the earth and the center of the sun. As the earth and moon balance around the shaft 12, the support B, through wheels 18, 16 and 20, will make one revolution about its center 14, thereby keeping the same side of the vertical band V always facing the sun and showing the exact portion of the earth illuminated any day in the year. That part of the band B' facing the sun is painted white to represent the light, while the other section is black to represent the night; and the whole is graduated to represent the hours of the day, 12 noon being at the central point facing the sun and 12 midnight immediately opposite. It will therefore be seen that the time of day at any meridian on the earth may be readily calculated when given the time at a determined point.

As the band V encircles the earth at its vertical center and always faces the sun, it is apparent that the sun's rays will always shine upon all the earth at one side thereof, while they will not touch that portion at the other side; and as the earth's axis is inclined to the plane of the ecliptic at an angle of 23 1-2 degrees, and the pole points to the same objective point, as the earth and moon move around their center of gravity, in passing around the sun, this band V will move alternately from 23 1-2 degrees at one side of the poles to the same distance at the opposite side; and will show that the sun's rays on December 21st will not reach the North Pole by 23 1-2 degrees and that the sun will shine under or beyond the South Pole the same distance, thus marking the Arctic and Antartic Circles and the limits of the Temperate Zones on the north and south, also of the Frigid Zones. On June 21st the band will stand at 23 1-3 degrees beyond the North Pole and will not reach the South Pole by that distance, and will again mark the circles and the limits of the Frigid Zones and the northern limit of the North Temperate Zone and the southern limit of the South Temperate Zone. The horizontal band B' is attached to the median portion of the vertical band V and as the center of the former, on the side facing the sun, is always in a line drawn from the center of the earth to the center of the sun, it will mark the limit of the sun's rays north and south of the equator on June 21st and December 21st respectively and will thus clearly indicate the position of the Tropic of Cancer and the Tropic of Capricorn, showing the limits of the Torrid Zone, the southern limit of the North Temperate Zone and the northern limit of the South Temperate Zone. It will be apparent that at the equinoxial periods, the vertical band V will encircle the earth from pole to pole and that the point marked 12 noon on the horizontal band B' will indicate that the vertical rays of the sun will fall upon the equator.

The construction of the elliptical table, and the marking thereon, besides indicating the days and months of the year, may also show the signs of the zodiac, indicate the summer and winter solstices, etc., and definitely point out the equinoxes and precession of the equinoxes, by the practical demonstration of the known fact that the inclination of the earth's axis is continually changing to the westward at the rate of about one degree in 70 years, which causes a falling back of the equinoxes and marks the notable difference between the sidereal and equinoxial year, as understood in the science of astronomy.

As before stated the moon will make a complete lunation in 29 1-2 days, or 12 5-13 lunations in one year, or 13 5-13 revolutions around the earth, in the same period. The fixed gear 20 has 40 cogs and the gear 19 attached to the shaft $19^a$ which controls the curved bar 27, which supports the inclined axis A of the earth, has 37 cogs. These two gears 20 and 19 with their relative proportions of 13 1-3 and 12 1-3, in connection with the idler 17, keep the earth's axis pointing practically in the same direction (with a slight variation). As the earth and moon are moved forward around the sun, the position of the earth's axis in relation to the sun is continually changing. Since the wheel 19 has 3 fewer cogs than the wheel 20, it follows that it will make nearly 1 1-2 revolutions during a complete lunation, and thus adjust the position of the earth's axis to the changed position, in its movement around the sun. If the moon made but 12 1-3 lunations or 13 1-3 revolutions around the earth in one year, the inclined axis of the earth would always point in the same direction, regardless of the number of times the earth and moon were moved around the sun; but there are 12 5-13 lunations in one year and the difference between 12 5-13 and 12 1-3 is 2-39. Then, the moon will make 2-39 of a revolution more in its orbit, in one year than the relative values of the gears 20 and 19, which is 13 1-3 and 12 1-3, which difference causes a slight relative change in the direction of the bar 27, and thus causes the earth's inclined axis to slightly change its direction backward, or to the right, looking from the sun. The equinoxes are at right angles to the inclination of the earth's axis, and as the direction of the latter is caused to move backward, it follows that the equinoxes will occur proportionately earlier. This change in the direction of the earth's axis is caused by the moon moving 2-39 or about 1-20 of the moon's orbit more than what is required to maintain the permanency of the earth's axis in one direction. This variation of the earth's axis causes the precession of the equinoxes as above indicated.

By moving the earth and moon globes around the sun, with all parts in operation, a number of times, to make a perceptible change in position, the vertical band V will show that the equinoxes will occur earlier during the year indicated to follow. The precession of the equinoxes may also be shown by throwing the mechanism out of gear and moving the moon forward in its orbit, for example, 60 degrees, the earth moving the same number of degrees around the shaft 12, which will cause the earth's axis to move to the right or backward about five degrees, thus causing the equinoxes to occur about five days earlier, as will be indicated by the band V. A greater or less movement of the moon in its orbit will show the equinoxes occurring at a proportionate variation of time. It may be said further, that if the sun appear in the sign of "Cancer" the earth will be in the opposite sign of "Capricornus", and the sun's right ascension is shown (on the chart on the face of the table) to be 6 hours or 90 degrees, while that of the earth is marked on the vertically read peripheral belt to be 18 hours or 270 degrees. This latter belt shows all the signs of the zodiac and the symbols of each, and the right ascension of the earth in hours and degrees for any day in the year, the width of the belt being elsewhere explained.

As seen in Figs. 1 and 2, I arrange upon the elliptical table a charted demonstration of the signs of the zodiac, and while I claim no novelty in such charts individually, I have adapted them to the elliptical conception of the earth's orbit around the sun,—and to the plane of the ecliptic. Hence, upon the periphery of the elliptical table T' I demonstrate the zodiacal belt Z of sixteen degrees in width, eight degrees being marked as being on each side of the plane of the ecliptic which I have indicated by the double line P in Fig. 1, and also properly divided the zodiac into its several signs. Upon the horizontal chart or surface of the table T', "Capricornus" appears between December and January at one end, and "Cancer" between June and July at the other; while upon the vertical "belt" chart appearing upon the periphery of the table and adjoining the other at the edge, these signs are reversed. This arrangement aids in explaining how the different signs are encountered at different seasons, and how they are reversed according to the point of view, whether from the sun or from the earth. For further educational purposes, I can so disconnect the mechanism, by loosing the set screw $R^3$ and thus throwing the bevel gears out of mesh, that a few movements of the parts controlling the earth and moon globes will be sufficient to mechanically change their position, and thus readily illustrate the desired points.

The general operation and functions of the different parts and groups of mechanism of my improved apparatus will, it is thought, be easily understood from the foregoing and from the drawings, but I may further explain that the whole of the mechanism is operated and produces all of the results above enumerated, by the movement of the handle H, and with it the arm carrying the main operating shaft R, and the earth and moon globes and the respective devices for operating same individually, so as to insure that the earth will move in an elliptical path around the sun, which latter as before mentioned, is stationary at one of the foci of the elliptical orbit of the earth as indicated upon the table; and the different proportions of gearing and combinations of these, with their immediate connecting devices, render the relative movements of the earth and moon in relation to the sun capable of absolute and correct demonstration for all of the purposes which I have set forth.

It must be understood that I do not limit myself to the precise construction or arrangement of mechanical devices herein shown, as they may be varied and modified according to the skill and judgment of a mechanic, without altering any essential operation, departing from any vital principle or sacrificing the advantages of my invention.

What I claim and desire to secure by Letters Patent, is—

1. In a tellurian, in combination with a table carrying a globe representing the sun, actuating means consisting of a circumferentially movable shaft geared to and finding its pivot upon said table, a frame at the outer end of said shaft carrying globes representing the earth and moon, an adjustable inclined disk mounted on said frame, means permitting the moon globe to bear upon said inclined disk whereby the globe is caused to rise and fall from the plane of the ecliptic in its orbit, and means for simultaneously revolving said earth and moon globes and said inclined disk in such manner that the sun will appear in the nodal point of the moon's orbit at the proper decreasing period for each year.

2. In a tellurian, in combination with a table carrying a globe representing the sun, actuating means consisting of a circumferentially-movable shaft geared to and finding its pivot upon said table,—a frame at the outer end of said shaft carrying a vertical shaft, upon which is fixed a horizontal bar,—a crown-gear having an inclined upper surface, eccentrically mounted about said vertical shaft,—an earth-globe mounted upon one end of said horizontal bar,—a rod carrying a moon-globe pivotally secured to the other end thereof and having secured thereon a guide-wheel adapted to travel on the inclined surface of said crown-gear,— and means connected with the first mentioned shaft for operating said horizontal bar whereby the earth and moon-globes will be simultaneously revolved in their proper direction and the latter will be caused to regularly rise and fall from the plane of the ecliptic and the sun to appear in the nodal point of the moon's orbit at its proper decreasing period for each year.

3. In a tellurian, in combination with a table carrying a globe representing the sun, actuating means consisting of a circumferentially-movable shaft geared to and finding its pivot upon said table,—a frame at the outer end of said shaft carrying a vertical shaft upon which is fixed a horizontal bar,—a crown-gear having an inclined upper surface, eccentrically mounted about said vertical shaft,—means for operatively connecting the movable shaft with the crown-gear,—an earth-globe mounted upon one end of said horizontal bar,—a rod carrying a moon-globe pivotally secured to the other end thereof and having secured thereon a guide-wheel adapted to travel on the inclined surface of said crown-gear,—means connected with the first mentioned shaft for operating said horizontal bar whereby the earth and moon globes will be simultaneously revolved in their proper directions and the latter will be caused to regularly rise and fall from the plane of the ecliptic and the sun to appear in the nodal point of the moon's orbit at the proper decreasing period for each year,—and means for disengaging said operative mechanism.

4. In a tellurian, in combination with a table carrying a globe representing the sun, actuating means consisting of a circumferentially-movable shaft geared to and finding its pivot on said table,—a frame at the outer end of said shaft carrying a vertical shaft, to the upper end of which is fixed a transverse bar for supporting an earth-globe,—a hub mounted on said vertical shaft having oppositely disposed, upwardly curved arms,—a vertical band constituting a segment of a circle, secured to said arms and adapted to encircle the earth-globe at its center, oppositely disposed semicircular bands marked to indicate the time of day, pivotally secured to the sides of said vertical band and adapted to stand in the plane of the ecliptic,—and means connecting the operating shaft with said hub and earth-globe, whereby said vertical band will be maintained in a plane at right angles to the operating shaft.

5. In a tellurian, in combination with a table carrying a globe representing the sun, actuating means consisting of a circumferentially movable shaft geared to and finding its pivot on said table,—a frame at the outer end of said shaft carrying a vertically mounted shaft upon which is secured a horizontal bar, in the outer end of which is mounted a vertical shaft carrying a toothed disk,—a bar conforming to the surface of the earth-globe secured above said disk,—a rod carrying an earth-globe fixed to said bar at a point 23 1-2 degrees from its point of support,—gearing connecting said disk with said earth-globe for operating the latter in its proper direction,—and means for connecting the operating shaft with said disk, for operating it.

6. In a tellurian, in combination with a table carrying a globe representing the sun, actuating means consisting of a circumferentially-movable shaft geared to and finding its pivot on said table,—a frame at the outer end of said shaft carrying a vertically mounted shaft on which is journaled a gear-wheel and having secured at its top a horizontal bar,—a vertical shaft journaled in the outer end of said bar, carrying at its lower end a gear connected with the first mentioned gear, and toward its upper end a toothed disk,—a bar conforming to the surface of the earth secured above said disk,— a rod carrying an earth-globe fixed perpendicularly to said bar at a point 23 1-2 degrees from its central point,—gearing connecting said disk with said earth-globe for operating the latter in its proper direction,—and means connecting the operating shaft with the first mentioned gearing for operating the same in such manner that the curved bar supporting the earth-globe will be reversed on its center, to cause the phenomenon known as the precession of the equinoxes.

7. In a tellurian, in combination with a table carrying a globe representing the sun, actuating means consisting of a circumferentially-movable shaft geared to and finding its pivot on said table,—a frame at the outer end of said shaft carrying a vertically mounted shaft on which is journaled a gear wheel and having secured at its top a horizontal bar,—a vertical shaft journaled in the outer end of said bar, carrying at its lower end a gear connected with the first mentioned gear, and toward its upper end a toothed disk,—a bar conforming to the surface of the earth secured above said disk,— a rod carrying an earth-globe fixed perpendicularly to said bar at a point 23 1-2 degrees from its central point and having a gear fixed at its base,—an idler meshing with the gear on said rod,—gearing connecting the disk with said idler whereby the earth globe is revolved in its proper direction,—and means connecting the operating shaft with said disk for operating it.

In testimony whereof I have signed in the presence of the two subscribing witnesses.

ISAAC N. MATLICK.

Witnesses:
 GEORGE TAZWELL,
 J. G. SMITHSON.

---

Copies of this patent may be obtained for five cents each, by addressing the "Commissioner of Patents, Washington, D. C."